United States Patent [19]

Tanaka et al.

[11] 3,829,895

[45] Aug. 13, 1974

[54] MULTI-CHANNEL MAGNETIC HEAD WITH OFFSET GAP LINES

[75] Inventors: Takashi Tanaka, Osaka; Yasuo Nomura, Hyoga, both of Japan

[73] Assignee: Matsushita Electric Industrial Co., Ltd., Kadoma, Osaka, Japan

[22] Filed: Aug. 27, 1973

[21] Appl. No.: 391,753

Related U.S. Application Data

[60] Continuation of Ser. No. 64,608, Aug. 17, 1970, which is a division of Ser. No. 882,926, May 8, 1969, abandoned.

[52] U.S. Cl. .................................. 360/121, 360/125

[51] Int. Cl. .......................... G11b 5/24, G11b 5/14

[58] Field of Search ......................... 346/74 MC, 17; 179/100.2 C, 100.2 MD; 340/174.1 F

[56] References Cited

UNITED STATES PATENTS

| | | | |
|---|---|---|---|
| 2,969,529 | 1/1961 | Gilson | 179/100.2 C |
| 3,082,505 | 3/1963 | Lawrance | 179/100.2 C |
| 3,247,483 | 4/1966 | Wood | 179/100.2 C |
| 3,564,153 | 2/1971 | Kronfield | 179/100.2 C |

*Primary Examiner*—Stanley M. Urynowicz
*Assistant Examiner*—Jay P. Lucas
*Attorney, Agent, or Firm*—Wenderoth, Lind & Ponack

[57] ABSTRACT

A multichannel magnetic head is provided with two offset gap lines formed in the face of the core tips. Non-magnetic material insulates adjacent core tips, and cross-talk is reduced by an over-lapping core construction. Various length back cores are provided to minimize the head size; but reluctances are equalized by varying core material, core cross-sectional area, or the gap between the back and the tip cores.

5 Claims, 12 Drawing Figures

MULTI-CHANNEL MAGNETIC HEAD WITH OFFSET GAP LINES

This is a continuation of application Ser. No. 64,608, filed Aug. 17, 1970, which is a division of application Ser. No. 822,926, filed May 8, 1969, now U.S. Pat. No. 3,597,836.

BACKGROUND OF THE INVENTION

1. Field of the Invention

This invention relates to a multi-channel magnetic head and to a method for making such a multi-channel magnetic head.

2. Prior Art

A conventional multi-channel magnetic head is merely a combination of a plurality of elementary magnetic heads which are magnetically separated from each other by non-magnetic materials such as organic resins or ceramics. In such a construction it is important that all the magnetic gaps of this plurality of elementary magnetic heads be aligned in one straight line for simultaneous recording and reproducing and for compatibility of different recording and reproducing devices. There has, however, been difficulty in aligning all the magnetic gaps of the elementary magnetic heads in one straight line during manufacture of such a multichannel magnetic head. In addition, in a conventional multi-channel magnetic head having such a construction, there is difficulty in reducing the cross talk between adjacent channels. In the conventional multichannel head, one possible way to reduce the cross talk is to insert shielding plates between adjacent elementary heads. But sometimes cross talk is not sufficiently reduced by shielding. Another possible way is to magnetically separate a plurality of elementary heads by using non-magnetic materials having a large size. A large size, however, is not desirable for a multi-channel magnetic head having a high track density.

SUMARY OF THE INVENTION

An object of the present invention is to provide a multi-channel magnetic head which allows only minimum cross talk between adjacent channels.

Another object of the invention is to provide a multichannel magnetic head having a high track denisty.

A further object of the invention is to provide a method for making a multi-channel magnetic head allowing only minimum cross talk between adjacent channels and having a high track density.

The multi-channel magnetic head according to the invention comprises a plurality of magnetic tip cores which are separated magnetically from each other by non-magnetic materials and each having a magnetic gap. A plurality of magnetic back cores are joined to said magnetic tip cores, and each has a winding wound thereon. Certain of said magnetic gaps are aligned in one straight line while the remainder are aliged in another straight line. The two straight lines are perpendicualr to the direction of tape movement through a recording and reproducing apparatus.

These and other objects of the invention will be apparent from the following detailed description taken together with the accompanying drawings.

DESCRIPTION OF PREFERRED EMBODIMENTS

Figure 1A:
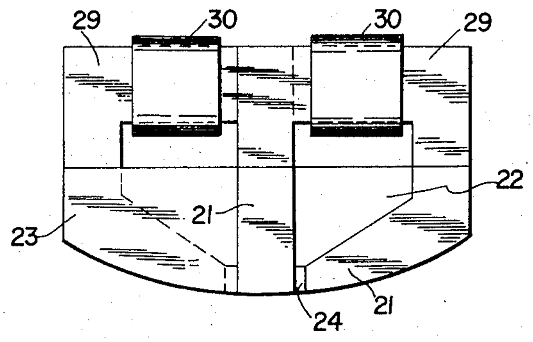
FIGS. 1*a*-1*d* are a plan view, a front elevation view, a side elevation view and a perspective view, respectively, of one embodiment of the multi-channel magnetic head according to the present invention.
Figure 1B:
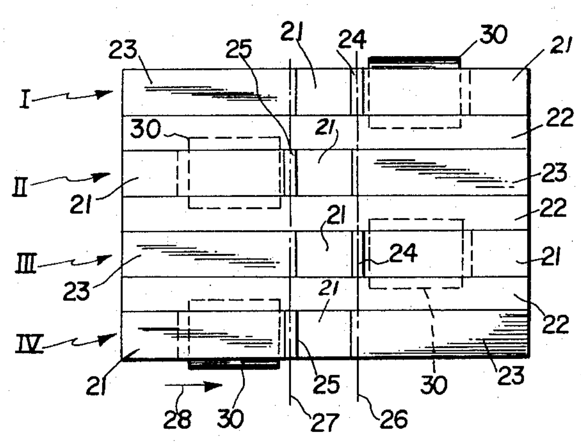
Figure 1C:
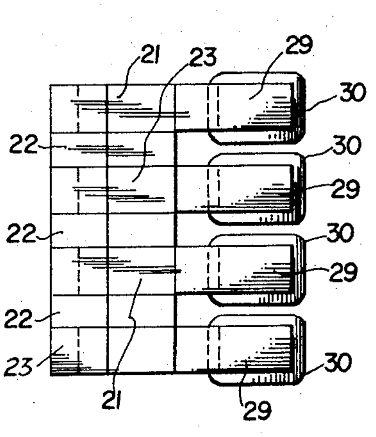
Figure 1D:
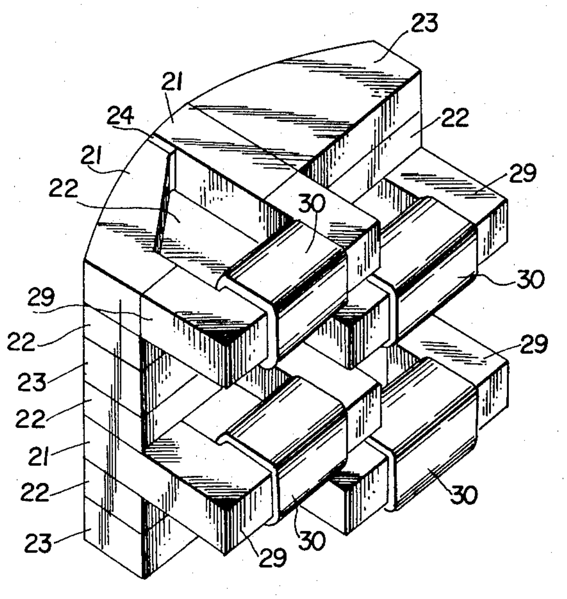
Figure 2A:
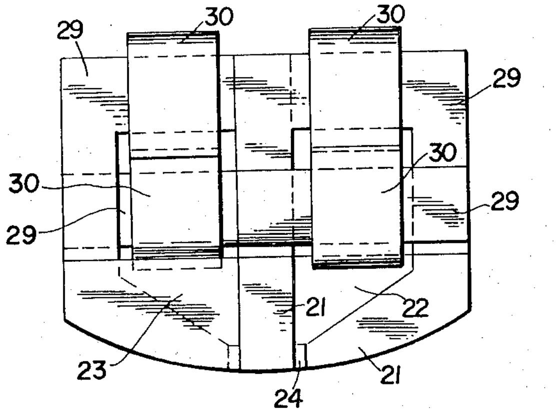
FIGS. 2*a*-2*d* are similar views of another embodiment.
Figure 2B:
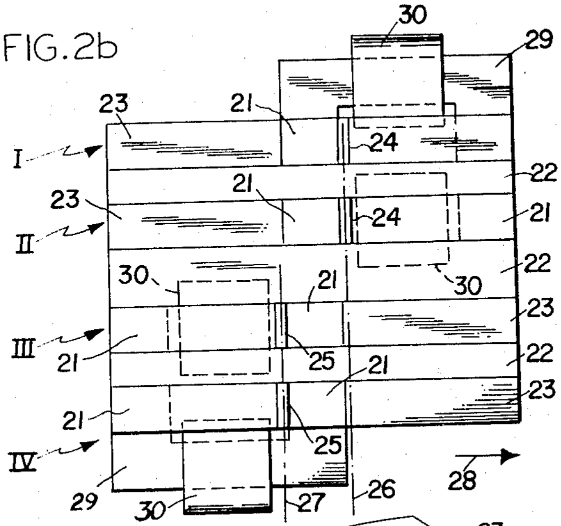
Figure 2C:
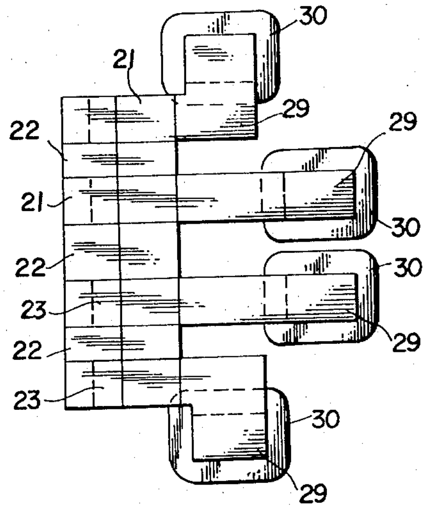
Figure 2D:
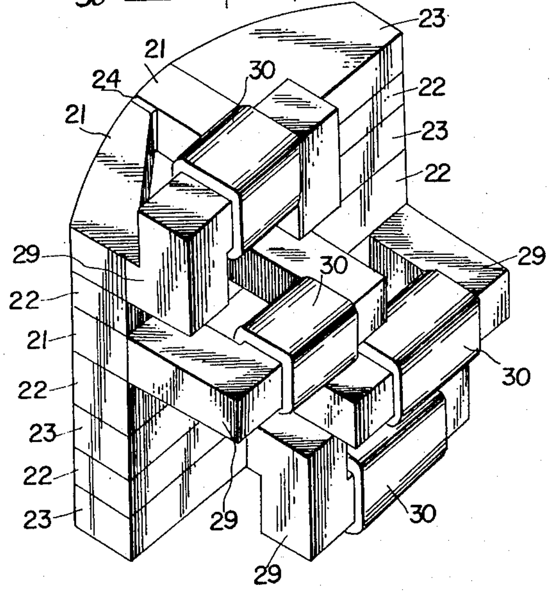

Referring to FIGS. 1*a*-1*d* and 2*a*-2*d*, a plurality of magnetic tip cores 21 are stacked in a stack and are separated magnetically from each other by layers 22 and 23 of non-magnetic materials. Certain of said plurality of magnetic tip cores 21 each has a magnetic gap 24 and each of the remainder has a magnetic gap 25. All of said magnetic gaps 24 are aligned in a first straight line 26 perpendicular to the direction of tape movement as shown by an arrow 28. All of said magnetic gaps 25 are aligned in a second straight line 27 perpendicular to said direction of tape movement and parallel to said first line 26. Each of said magnetic tip cores 21 has a magnetic back core 29 joined thereto. A winding 30 is wound on each of said back cores 29.

The windings 30 are spaced from each other in the embodiment of FIGS. 1*a*-1*d* by having alternate windings laterally offset from each other in a direction transverse to the said vertical lines 26 and 27. Thus the windings 30 for the second and fourth magnetic tip cores 21 in the stack of cores are vertically aligned and laterally offset from the windings 30 for the first and third magnetic tip cores. All of the windings 30 are in the same general plane. As a result, cross talk is reduced.

Alternatively, it is possible for each of said magnetic back cores to have a different shape from that of the adjacent cores, such as shown in FIGS. 2*a*-2*d*, in order to provide a sufficient spacing between each pair of windings and in order to reduce the cross talk. In such a case, it is desirable that said magnetic back cores have different magnetic permeabilities or different cross-sectional areas at which they are joined to said magnetic tip cores or are jointed to said magnetic tip cores with different spaces therebetween, so that said magnetic back cores have magnetic reluctances which are essentially the same as each other. In the embodiment shown, the back core 29 for the winding 30 for the first magnetic tip core 21 in the stack is bent forwardly out of the plane of the magnetic tip core, while the back core 29 for the second magnetic tip core 21 in the stack is extended rearwardly of the plane of the first winding 30. Thus, the windings 30 on these two back cores 29 are spaced in the direction of the stacking of the magnetic tip cores 21 as well as laterally of this direction having a greater distance than the windings 30 of FIGS. 1*a*-1*d*. The back cores 29 of the third and fourth magnetic tip cores 21 are in the same relationship, the third back core being extended rearwardly and the fourth back core being bent downwardly. Clearly other permutations and combinations of these and similar arrangements are possible and will be apparent to those skilled in the art.

Figure 3:
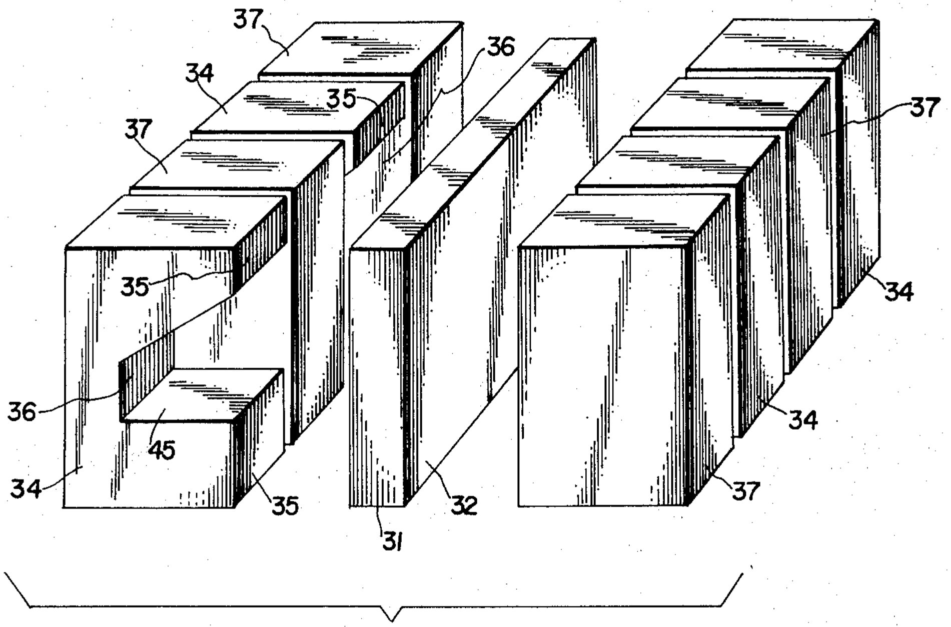
FIGS. 3 to 6 are perspective views showing the method of making of multi-channel magnetic head according to the invention.

The above-mentioned multi-channel magnetic head is made by the folowing process. Referring to FIG. 3, the first step is to provide a magnetic plate 31 having major opposite surfaces 32 (only one surface 32 is visible in the drawing) which are smoothly polished and are parallel to each other.

The second step is to provide a plurality of parallelepipeds 34 of magnetic material, each of which has one surface 35 smoothly polished and each having at least one groove 36 across the polished surface 35. It is preferable that the smoothness of said surfaces 32 of said magnetic plate 31 and said surfaces 35 of said magnetic parrallelepipeds 34 be such that the irregularities project less than 1 micron, because two of these surfaces abutting each other will then form a magnetic gap which at the most has a length less than several microns.

The third step is to provide a plurality of parallelepipeds 37 of non-magnetic material which are similar in shape to said plurality of magnetic material parallelepipeds 34.

Figure 4:
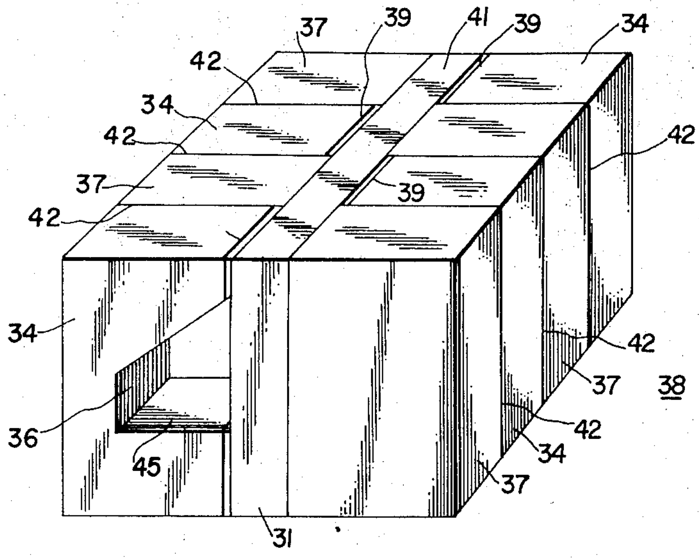

The fourth step is to form a composite body 38, as shown in FIG. 4, with alternating magnetic material parallelepipeds 34 and non-magnetic material parallelepipeds 37 adhered to each other and to the magnetic plate 31 with the non-magnetic parallelepipeds 37 adhered to one of said major surfaces 32 of said magnetic plate 31 and with a gap filled with adhesive between the polished surface 35 of each magnetic parallelepiped 34 and said one major surface 32. Alternating magnetic material parallelepipeds 34 and non- magnetic material parallelepipeds 37 are similarly adhered to the other of said major surfaces 32 at positions with non-magnetic material parallelepipeds 37 opposite magnetic material parallelepipeds 34 and vice-versa. Said magnetic gaps 39 form the two magnetic gaps 24 and 25 described with reference to FIG. 1. The adhesion is effected by using any available and suitable adhesive such as epoxy resin or glass.

It is preferable that all the members of said composite body 38 are made of similar kind of materials from the view point of wear resistance. For example, when said magnetic plate 31 and said magnetic material parallelepipeds 34 are made of oxides such as Mn-Zn ferrite, said non-magnetic parallelepipeds 37 can be made of ceramics such as Zn-ferrite. The Mn-Zn ferrite bodies and Zn-ferrite bodies are adhered together by glass which fills magnetic gaps 39. When said non-magnetic material parallelepipeds 37 and said magnetic gaps 39 are material such as bronze, then said magnetic plate 31 and said magnetic parallelepipeds 34 can be of metal such as permalloy.

Figure 5:
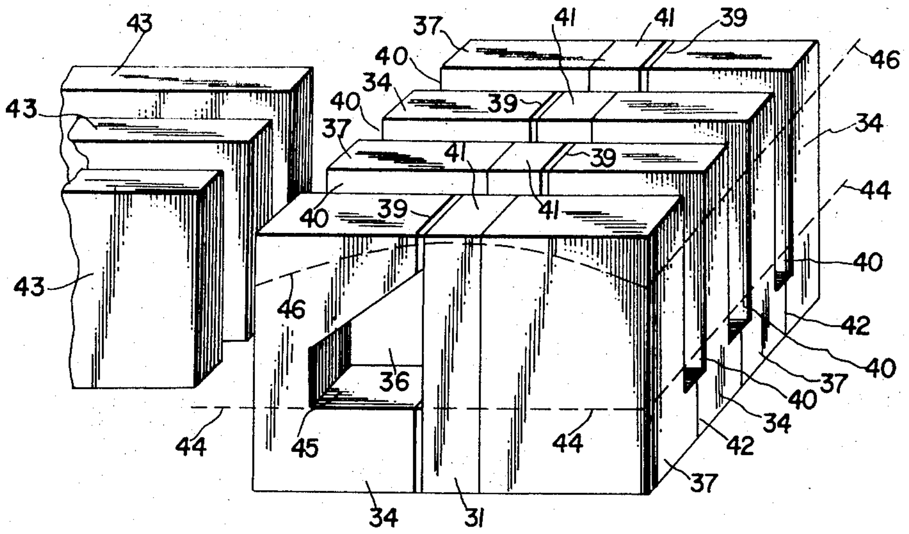

The fifth step is cut slots 40 having a parallelepiped form and which are perpendicular to both the edge surfaces 41 and major surface 32 of said magnetic plate 31. Slots 40 are cut at each boundary line 42 between a magnetic material parallelepiped 34 and a non-magnetic material parallelepiped 37. Said slots 40 each has a width corresponding to the space between adjacent tracks on a tape and a depth extending into the material of the magnetic material parallelepipeds 34 beyond the remote side wall plane 45 of grooves 36, as shown in FIG. 5. It is possible to provide slots at other locations than at said boundary lines 42 in addition to said slots 40 at said boundary lines 42.

The sixth step is to insert into said slots 40 non-magnetic plates 43 having essentially the same size as said slots 40, and to adhere said non-magnetic plates 43 to said composite body 38.

Figure 6:
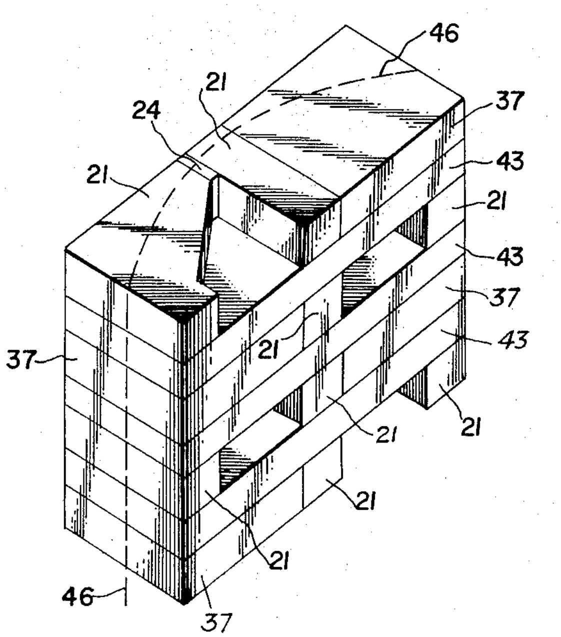

The seventh step is to cut the resultant composite body in a plane 44, shown by broken lines in FIG. 5, which is parallel to said edge surfaces 41 of said magnetic plate 31 and which is essentially coincident with the bottom plane 45 of said grooves 36 so that the part of composite body 38 having said grooves 36 therein forms a stack of tip cores 21 separated magnetically from each other by said non-magnetic plates 43. Said stack of tip cores 21 is shown in FIG. 6. Each of said plurality of tip cores 21 consist of said magnetic plate 31 and the remaining portion of the magnetic material parallelepipeds 34 of FIG. 4. Said non-magnetic plates 43 and said non-magnetic material parallelepipeds 37 of FIG. 6 correspond to the non-magnetic materials 22 and 23 of FIGS. 1a-1d and 2a-2d, respectively. The front surface having the magnetic gaps 39 therein is formed into a curved surface by removing material to the broken line 46 in FIGS. 5 and 6.

The eighth step is to join a plurality of magnetic back cores 29 having windings 30 thereon to said plurality of magnetic tip cores 21, as shown in FIGS. **1*a*-1*d* and 2*a*-2*d*, using any available and suitable adhesive. It is not necessary that said magnetic back cores 29 be made of the same material as the magnetic tip cores 21.**

The novel multi-channel magnetic head according to the invention allows less cross talk than does a conventional multichannel head which has the magnetic gaps aligned in one straight line. A practical embodiment of the novel multi-channel magnetic head shown in FIGS. **2*a*-2*d* has four elementary heads I, II, III and IV, the space 22 between elementary heads I and II or III and IV being about 0.32 mm and the space 22 between elementary heads II and III being about 0.71 mm. With such a construction, the cross talk between elementary heads I and II or III and IV is about −35*d*B and the cross talk between elementary heads II and III is about −50*d*B.**

According to the method of this invention, a multi-channel head can be made of magnetic and non-magnetic ferrites so that the head has a very long life.

What is claimed is:

1. A multi-channel magnetic head comprising a stack of a plurality of magnetic tip cores each having a single magnetic gap, non-magnetic material between each two magnetic tip cores magnetically separating adjacent tip cores, a plurality of magnetic back cores, one joined to each of said plurality of magnetic tip cores; and a plurality of windings wound on the respective back cores, a portion of said plurality of magnetic gaps being aligned in a first straight line and the remainder being aligned in a second straight line parallel to the first straight line and offset from the magnetic gaps of said first line in the direction of the length of said lines, said lines being perpendicular to a direction of tape movement past the magnetic head, the tip cores having the magnetic gaps of said first line overlapping, in the direction of the length of said lines, the tip cores having the magnetic gaps of said second line.

2. A multi-channel magnetic head as claimed in claim 1 wherein said plurality of magnetic back cores have different shapes for separating the windings from each other.

3. A multi-channel magnetic head as claimed in claim 2 wherein said plurality of magnetic back cores have different magnetic permeabilities for giving to said back cores reluctances which are essentially the same as each other.

4. A multi-channel magnetic head as claimed in claim 2 wherein said plurality of magnetic back cores have at least two different cross-sectional areas where they are joined to said magnetic tip cores for giving to said magnetic back cores reluctances which are essentially the same as each other.

5. A multi-channel magnetic head as claimed in claim 2 wherein said plurality of magnetic back cores are joined to the respective magnetic tip cores with different width spaces between the back cores and the tip cores for giving to the back cores reluctances which are essentially the same as each other.

* * * * *